US009351185B2

United States Patent
Charbit et al.

(10) Patent No.: US 9,351,185 B2
(45) Date of Patent: May 24, 2016

(54) LTE CARRIER AGGREGATION CONFIGURATION ON TV WHITE SPACE BANDS

(75) Inventors: Gilles Charbit, Farnborough (GB); Haiming Wang, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 82 days.

(21) Appl. No.: 14/111,577

(22) PCT Filed: Apr. 15, 2011

(86) PCT No.: PCT/CN2011/072853
§ 371 (c)(1),
(2), (4) Date: Oct. 14, 2013

(87) PCT Pub. No.: WO2012/139301
PCT Pub. Date: Oct. 18, 2012

(65) Prior Publication Data
US 2014/0044000 A1    Feb. 13, 2014

(51) Int. Cl.
*H04W 24/08*    (2009.01)
*H04W 24/10*    (2009.01)
*H04W 72/04*    (2009.01)
*H04W 16/14*    (2009.01)

(52) U.S. Cl.
CPC .............. *H04W 24/08* (2013.01); *H04W 24/10* (2013.01); *H04W 16/14* (2013.01)

(58) Field of Classification Search
None
See application file for complete search history.

(56) References Cited

U.S. PATENT DOCUMENTS

| 2010/0195580 | A1  | 8/2010  | Samarasooriya et al. |
|---|---|---|---|
| 2011/0081936 | A1  | 4/2011  | Haim et al. |
| 2011/0164580 | A1* | 7/2011  | Keon ............................ 370/329 |
| 2011/0280227 | A1* | 11/2011 | McCann et al. ............... 370/338 |
| 2012/0115536 | A1* | 5/2012  | Vermani et al. ............... 455/522 |
| 2012/0122477 | A1* | 5/2012  | Sadek et al. ................ 455/456.1 |
| 2012/0134328 | A1* | 5/2012  | Gauvreau et al. ............. 370/329 |
| 2012/0163309 | A1* | 6/2012  | Ma et al. ........................ 370/329 |
| 2012/0233635 | A1* | 9/2012  | Hakola et al. .................... 725/25 |
| 2012/0264468 | A1* | 10/2012 | Turtinen et al. ............... 455/509 |

FOREIGN PATENT DOCUMENTS

CN    101835191 A    9/2010

OTHER PUBLICATIONS

Iwamura, Mikio, et al.; Carrier Aggregation Framework in 3GPP LTE-Advanced (IEEE Communication Magazine, vol. 48, issue 8; Aug. 2010; (pp. 60-67).

(Continued)

*Primary Examiner* — Chi H Pham
*Assistant Examiner* — Soon-Dong D Hyun
(74) *Attorney, Agent, or Firm* — Oblon, McClelland, Maier & Neustadt, L.L.P.

(57) ABSTRACT

An apparatus, method and computer program product comprise controlling cellular network based communication in a primary cell on a frequency band related to the cellular network and by using an uplink and downlink configuration specific to the primary cell; controlling communication in a secondary cell on a frequency band related to a television white space channel and by using an uplink and downlink configuration specific to the secondary cell; measuring radio interference on a temporarily set uplink related carrier on the secondary cell based on information on the temporarily set uplink related carrier received on a downlink related carrier on the primary cell; and reporting results of radio interference measurement via the primary cell.

19 Claims, 5 Drawing Sheets

(56) References Cited

OTHER PUBLICATIONS

3GPP TR 36.816 V1.1.1 (Mar. 2011); 3rd Generation Partnership Project; Technical Specification Group Radio Access Networks; Evolved Universal Terrestrial Radio Access (E-UTRA); Study on signalling and procedure for interference avoidance for in-device coexistence (Release 10) (39 Pages).

Stevenson, et al.: Cognitive Radio Wireless Regional Area Network Standard; IEEE 802.22; IEEE Communications Magazine;Jan. 2009 (10 Pages).

* cited by examiner

LTE CARRIER AGGREGATION CONFIGURATION ON TV WHITE SPACE BANDS

TECHNICAL FIELD

The present application relates generally to an apparatus and method for configuring carrier aggregation onto unused radio bands/channels.

BACKGROUND

Prior art which may provide useful background information to this technical field can e.g. be found by the technical specification TS 36.816 (current version: 1.0.1) of the 3GPP.

The following meanings for the abbreviations used in this specification apply:
3GPP 3$^{rd}$ Generation Partnership Project
A-LTE Advanced LTE
BCCH Broadcast Control Channel
BS Base Station
BT Bluetooth
CDIS Coexistence Discovery and Information Server
C carrier
CC Carrier Component
CE Coexistence Enabler
CM Co-existence Manager
CMRS Commercial Mobile Radio Service
DCI Downlink Control Information
DL Downlink
DRX Discontinuous Reception
EDGE Enhanced Data Rates for GSM Evolution
eNB evolved Node B
FCC Federal Communications Commission
FDD Frequency Domain Duplexing
GERAN GSM EDGE Radio Access Network
GNSS Global Navigation Satellite System
GSM Global System for Mobile Communications
HARQ Hybrid Automatic Request
IEEE Institute of Electrical and Electronics Engineers
ISM Industrial Scientific Medical
LTE Long Term Evolution
MAC Media Access Control
PCell Primary Cell
PDCCH Physical Downlink Control Channel
PLMRS Private Land Mobile Radio Service
PRB Physical Resource Block
RRC Radio Resource Control
SCell Secondary Cell
TDD Time Domain Duplexing
TDM Time Domain Multiplexing
TVBD TV Band Devices
TVWS Television White Space
UE User Equipment
UL Uplink
UMA Unlicenced Mobile Access
UMTS Universal Mobile Telecommunications System
USB Universal Serial Bus
UTRAN UMTS Terrestrial Radio Access Network
WiFi Wireless Fidelity
WMTS Wireless Medical Telemetry Service
WRAN Wireless Regional Area Network The deployment of LTE wireless nodes such as macro/micro eNBs, pico eNBs, and Home eNBs in heterogeneous networks in the same spectrum create new interference challenges. The study of these challenges and potential solutions are currently part of an agreed Release 10 Working Item in 3GPP (see e.g. RP-100383, "New Work Item Proposal: Enhanced ICIC for non-CA based deployments of heterogeneous networks for LTE", RAN#47, March 2010). It shall Include consideration of Rel8/9 techniques and ensure backward compatibility for Rel8/9 terminals as well as minimize physical layer air interface impact.

To prevent that licensed spectrum scarcity becomes a bottleneck for such heterogeneous networks with ever increasing levels of interference, LTE systems could also be deployed in the TV White Space (TVWS) bands with the licensed band resources being used during the initial setup. The potential use of TV white spaces has been investigated widely in the recent years, due to their available large bandwidths at suitable frequencies for different radio applications.

In the US, the Federal Communications Commission (FCC) have regulated licensed or license-exempt TV bands for the secondary-system applications (i.e. cellular, WiFi, WiMax)) on TV Band Devices (TVBD).

At present, the FCC defines two concepts for the help of find available channels, namely a TV bands database and the geo-location capability. A TV band database that maintains records of all authorized services in the TV frequency bands is capable of determining the available channels as a specific geographic location and provides lists of available channels to any TVBD that has been certified under the FCC's equipment authorization procedures. The geo-location capability is defined for some of the TVBD. A TVBD with such capability should be able to determine its geographic coordinates within a certain level of accuracy (±50 m). This capability is used with a TV bands database to determine the availability of TV channels at the specific location of a TVBD.

The following table gives the available TVWS bands in the US (see e.g. FCC 10-174, "SECOND MEMORANDUM OPINION AND ORDER", Sep. 23, 2010). Each TV channel has 6 MHz bandwidth and would typically be sufficient for any of the wireless communications.

| Frequency Range (correspond TV channel numbers) | Center Frequency | Available bandwidth |
|---|---|---|
| 54-60 MHz (2) | 57 MHz | 6 MHz |
| 76-88 MHz (5, 6) | 82 MHz | 12 MHz |
| 174-216 MHz (7-13) | 195 MHz | 42 MHz |
| 470-608 MHz (14-36) | 539 MHz | 138 MHz |
| 614-698 MHz (38-51) | 656 MHz | 84 MHz |

Most of the current applications in the TV bands are considered as primary applications, including;
  TV services: including analog services and digital services. They can occupy any VHF and UHF channel (2 to 51), except channel No. 37.
  The Wireless Medical Telemetry Service (WMTS) and radio astronomy: using TV channel 37 (608-614 MHz). This channel cannot be used for any other services. Further, no TVBD is allowed to operate at any band within 2.4 km of the facilities using radio astronomy services to avoid causing interference.
  The Private Land Mobile Radio Service (PLMRS) and the Commercial Mobile Radio Service (CMRS): They can use 1 to 3 TV channels in the range of channels 14-20.
  Some regional based services: Such as the Offshore Radio-telephone Service which uses channels 15-17 in certain regions along the Gulf of Mexico, and the inter-Island communications in Hawaii, which use channel 17.

In addition, there are also some existing secondary systems such as wireless microphone (channel 7-46) and unlicensed remote control devices (above channel 4).

To help the TVBDs find available channels, the FCC has introduced the following:

TVWS database available online by the TVBDs (typically via internet connection) that indicate the available channels at a specific geographic location.

TVBD geo-location capability using GPS or other adequate positioning methods within required accuracy. This is used with the TVWS database to check the available TV channels at a TVBD's location.

Such mechanisms aim to set up TVBD connections in TVWS channels when not used by the primary systems, but do not apply to secondary systems. Cellular network operators may have cellular database showing their coverage accurately, but are unlikely to allow competitors to use them. On the other hand, a WiFi database including home WiFi networks is not likely.

There is a need to find a solution that allows to on the one hand re-use existing mechanisms to check TVWS channels which are not used by primary systems (i.e. TVWS database, TVBD geo-location), while on the other hand determine whether available TVWS channels are also free from other secondary-system interference.

IEEE 802.22 is a standard for Wireless Regional Area Network (WRAN) using white spaces in the TV frequency spectrum (see e.g. C. Stevenson, et. al, "IEEE 802.22: The first cognitive radio wireless regional area network standard," IEEE Communication, January 2009). The IEEE 802.22 WRAN standard aims to using cognitive radio techniques to allow sharing of geographically unused spectrum allocated to the Television Broadcast Service, on a non-interfering basis, in order to bring broadband access to hard-to-reach, low population density areas, typical of rural environments. IEEE 802.22 introduces a general co-existence beacon which is transmitted during so-called co-existence windows at the end of some frames by the base station (BS) and/or some designated device. These co-existence beacons are monitored by the BSs and other devices from same and different cells on the same channel or different channel for the future channel switching purposes.

IEEE 802.19.1 proposes co-existence mechanisms for heterogeneous networks in TVWS (see e.g. Developing a Standard for TV White Space Coexistence: Technical Challenges and Solution Approaches, Tuncer Baykas, NICT, Mark Cummings, Envia, Hyunduk Kang, ETRI, Mika Kasslin, Nokia, Joe Kwak, InterDigital, Richard Paine, Alex Reznik, InterDigital, Rashid Saeed, TMRND, and Stephen J. Shellhammer, Qualcomm, http://www.ieee802.org/19/arc/stds-802-19list/docrnXZz7qdyI.doc). A common control block enables the coexistence between different secondary systems, which can exchange the necessary information and determine how to share the resources. A Coexistence Manager (CM) is used for discovery of other CMs, making coexistence decisions, support exchange of information required for coexistence among CMs, and assist network operators in management related to TVWS coexistence. The Coexistence Enabler (CE) requests co-existence information from TVBD network or device, translates reconfiguration requests/commands and control information received from the Coexistence Manager (CM) into TVBD-specific reconfiguration requests/commands and sends them to the TVBD network or device; the Coexistence Discovery and Information Server (CDIS) supports discovery of CMs (facilitates the opening of interfaces between CMs), and to collect, aggregate, and provide information facilitating coexistence. The general mechanisms described in 802.22 and 802.19.1 could to some extent apply to cellular TVBDs, but specific ways for the setting up of LTE cellular systems (i.e. configuration of DL and UL carriers on TVWS band for LTE communications between the eNBs and LTE TVBDs) are not covered in the IEEE standardization.

In the specification TR 36.816, Release 10, v1.0.1, "Study on signalling and procedure for interference avoidance for in-device coexistence", mechanisms to avoid coexistence interference between collocated radio transceivers in devices equipped with LTE, WiFi, BT transceivers and GNSS receivers are considered. The level of interference depends on whether the LTE and ISM bands are close and on assumptions on filtering, antenna isolation and so on. Interference avoidance based on internal coordination between the ISM and LTE radio technologies within the same UE is one way proposed (possibly coordinated with the network, which decides how to avoid the interference). Other ways based on LTE network-controlled UE-assisted solutions involve (i) Frequency Domain Multiplexing by moving the LTE signal away from the ISM band or moving the WiFi signal away from the LTE band; (ii) Time Domain Multiplexing of WiFi and LTE signals via DRX-based TDM patterns or HARQ process reservation; (iii) LTE Power Control or ISM Power Control. Interference measurements in the ISM band and the LTE band may be needed depending on the solution type. The solutions require dedicated signaling—e.g. DRX-based TDM patterns can be configured for a specific device to avoid in-device interference.

SUMMARY OF THE INVENTION

It is an object of the present invention to provide an apparatus and method for configuring carrier aggregation onto unused radio bands/channels.

According to a first aspect of the present invention, this is accomplished by an apparatus, comprising cellular communication means configured to control cellular network based communication in a primary cell on a frequency band related to the cellular network and by using an uplink and downlink configuration specific to the primary cell; television white space communication means configured to control communication in a secondary cell on a frequency band related to a television white space channel and by using an uplink and downlink configuration specific to the secondary cell; interference measurement means configured to measure radio interference on a temporarily set uplink related carrier on the secondary cell based on information on the temporarily set uplink related carrier received on a downlink related carrier on the primary cell; and measurement reporting means configured to report results of radio interference measurement via the primary cell.

Modifications of the first aspect may be as follows.

The apparatus according to the first aspect may be configured to be suitable for configuring carrier aggregation onto unused radio bands/channels.

The interference measurement means can be further configured to detect all available television white space channels and to repeat measurement for each of them.

The cellular communication means and the television white space communication means can be both further configured to control frequency domain duplexing based communication; the uplink and downlink configuration specific to the primary cell can be represented by separate carriers for uplink and downlink, respectively, so that the information on the temporarily set uplink related carrier is received on a dedicated downlink carrier of the primary cell; the uplink and downlink configuration specific to the secondary cell can be represented by separate carriers for uplink and downlink, respectively, so that the temporarily set uplink related carrier on the secondary cell is a dedicated uplink carrier of the secondary cell; and the television white space communication means can be further configured to process information about setting of non-temporary carriers for uplink and downlink, respectively, received in response to operation of the measurement reporting means, and to control the communication in the secondary cell by setting these separate non-temporary carriers for uplink and downlink, respectively.

The cellular communication means and the television white space communication means can be both further configured to control time domain duplexing based communication; the uplink and downlink configuration specific to the primary cell can be represented by an uplink and downlink subframe configuration on a common carrier so that the information on the temporarily set uplink related carrier is received on a downlink subframe of the carrier of the primary cell; the uplink and downlink configuration specific to the secondary cell can be represented by an uplink and downlink subframe configuration on a common carrier so that the temporarily set uplink related carrier on the secondary cell is a an uplink subframe on the common carrier of the secondary cell; and the television white space communication means can be further configured to process information about setting of a non-temporary uplink and downlink configuration on a common carrier received in response to operation of the measurement reporting means, and to control the communication in the secondary cell by setting this non-temporary uplink and downlink configuration on a common carrier.

According to a second aspect of the present invention, the object is accomplished by an apparatus, comprising a cellular communication controller configured to control cellular network based communication in a primary cell on a frequency band related to the cellular network and by using an uplink and downlink configuration specific to the primary cell; a television white space communication controller configured to control communication in a secondary cell on a frequency band related to a television white space channel and by using an uplink and downlink configuration specific to the secondary cell; an interference measurement processor configured to measure radio interference on a temporarily set uplink related carrier on the secondary cell based on information on the temporarily set uplink related carrier received on a downlink related carrier on the primary cell; and a measurement reporting processor configured to report results of radio interference measurement via the primary cell.

Modifications of the second aspect of the present invention may correspond to the modifications of the first aspect.

According to a third aspect of the present invention, the object is accomplished by a method, comprising controlling cellular network based communication in a primary cell on a frequency band related to the cellular network and by using an uplink and downlink configuration specific to the primary cell; controlling communication in a secondary cell on a frequency band related to a television white space channel and by using an uplink and downlink configuration specific to the secondary cell; measuring radio interference on a temporarily set uplink related carrier on the secondary cell based on information on the temporarily set uplink related carrier received on a downlink related carrier on the primary cell; and reporting results of radio interference measurement via the primary cell.

Modifications of the third aspect may be as follows.

The method according to the third aspect may be configured to be suitable for configuring carrier aggregation onto unused radio bands/channels.

The method can further comprise detecting all available television white space channels and repeating measurement for each of them.

The controlling cellular network based communication and the controlling communication on a frequency band related to a television white space both can include controlling frequency domain duplexing based communication; the uplink and downlink configuration specific to the primary cell can be represented by separate carriers for uplink and downlink, respectively, so that the information on the temporarily set uplink related carrier is received on a dedicated downlink carrier of the primary cell; the uplink and downlink configuration specific to the secondary cell can be represented by separate carriers for uplink and downlink, respectively, so that the temporarily set uplink related carrier on the secondary cell is a dedicated uplink carrier of the secondary cell; and the controlling communication on a frequency band related to a television white space can further include processing information about setting of non-temporary carriers for uplink and downlink, respectively, received in response to the reporting, and controlling the communication in the secondary cell by setting these separate non-temporary carriers for uplink and downlink, respectively.

The controlling cellular network based communication and the controlling communication on a frequency band related to a television white space both can include controlling time domain duplexing based communication; the uplink and downlink configuration specific to the primary cell can be represented by an uplink and downlink subframe configuration on a common carrier so that the information on the temporarily set uplink related carrier is received on a downlink subframe of the carrier of the primary cell; the uplink and downlink configuration specific to the secondary cell can be represented by an uplink and downlink subframe configuration on a common carrier so that the temporarily set uplink related carrier on the secondary cell is a an uplink subframe on the common carrier of the secondary cell; and the controlling communication on a frequency band related to a television white space can further include processing information about setting of a non-temporary uplink and downlink configuration on a common carrier received in response to the reporting, and controlling the communication in the secondary cell by setting this non-temporary uplink and downlink configuration on a common carrier.

The method according to the third aspect or any of its modifications may be performed by the apparatus according to the first or second aspect or suitable ones of their modifications.

According to a fourth aspect of the present invention, the object is accomplished by a chipset or a communication handset, comprising an apparatus according to the first or second aspect or any of their modifications.

According to a fifth aspect of the present invention, the object is accomplished by a computer program product comprising computer-executable components which perform, when the program is run on a computer controlling cellular network based communication in a primary cell on a frequency band related to the cellular network and by using an uplink and downlink configuration specific to the primary cell; controlling communication in a secondary cell on a frequency band related to a television white space channel and by using an uplink and downlink configuration specific to the secondary cell; measuring radio interference on a temporarily set uplink related carrier on the secondary cell based on information on the temporarily set uplink related carrier received on a downlink related carrier on the primary cell; and reporting results of radio interference measurement via the primary cell.

Modifications of the fifth aspect may be as follows.

The computer program product according to the fifth seventh aspect may be suitable for configuring carrier aggregation onto unused radio bands/channels.

The computer program product according to the fifth aspect may be embodied as a computer-readable storage medium.

Otherwise, modifications of the fifth aspect may correspond to the modifications of the third aspect.

It is to be understood that any of the above modifications can be applied singly or in combination to the respective aspects to which they refer, unless they are explicitly stated as excluding alternatives.

BRIEF DESCRIPTION OF THE DRAWINGS

The above and other objects, features, details and advantages will become more fully apparent from the following detailed description of example embodiments which is to be taken in conjunction with the appended drawings, in which.

DETAILED DESCRIPTION OF THE EXAMPLE EMBODIMENTS

In the following, description is made to what are presently considered to be suitable embodiments of the present invention. It is to be understood, however, that the description is given by way of example only, and that the described embodiments are by no means to be understood as limiting the present invention thereto.

For example, for illustration purposes, in some of the following exemplary embodiments a configuration of carrier aggregation onto unused radio bands/channels as e.g. based on LTE or LTE-Advanced is described. However, it should be appreciated that these exemplary embodiments are not limited for use among these particular types of wireless communication systems, and according to further exemplary embodiments, the present invention can be applied also to other types of communication systems and access networks.

Thus, certain embodiments of the present invention relate to mobile wireless communication systems, such as 3GPP LTE and 3GPP LTE-Advanced. In more detail, certain embodiments of the present invention are related to the configuration of carrier aggregation onto unused radio bands/channels by using an LTE eNB and LTE UE, respectively, and components thereof, or the like.

However, as indicated above, the present invention is not limited to eNB/UE, and other embodiments of the present invention are for example related to other communication nodes and components thereof.

Figure 1:
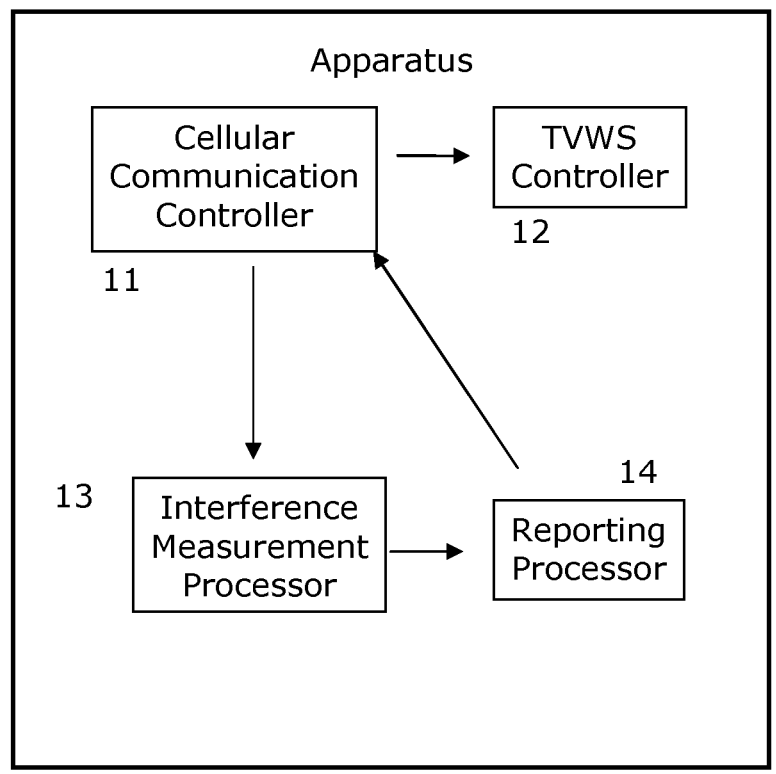
FIG. 1 shows an apparatus according to certain embodiments of the present invention.

FIG. 1 shows a principle configuration of an example for an apparatus according to certain embodiments of the present invention. One option for implementing this example for an apparatus according to certain embodiments of the present invention would be a component in a handset such as user equipment according to LTE.

Specifically, as shown in FIG. 1, the example for an apparatus comprises a cellular communication controller 11 configured to control cellular network based communication in a primary cell on a frequency band related to the cellular network and by using an uplink and downlink configuration specific to the primary cell; a television white space communication controller 12 configured to control communication in a secondary cell on a frequency band related to a television white space channel and by using an uplink and downlink configuration specific to the secondary cell; an interference measurement processor 13 configured to measure radio interference on a temporarily set uplink related carrier on the secondary cell based on information on the temporarily set uplink related carrier received on a downlink related carrier on the primary cell; and a measurement reporting processor 14 configured to report results of radio interference measurement via the primary cell.

Figure 2:
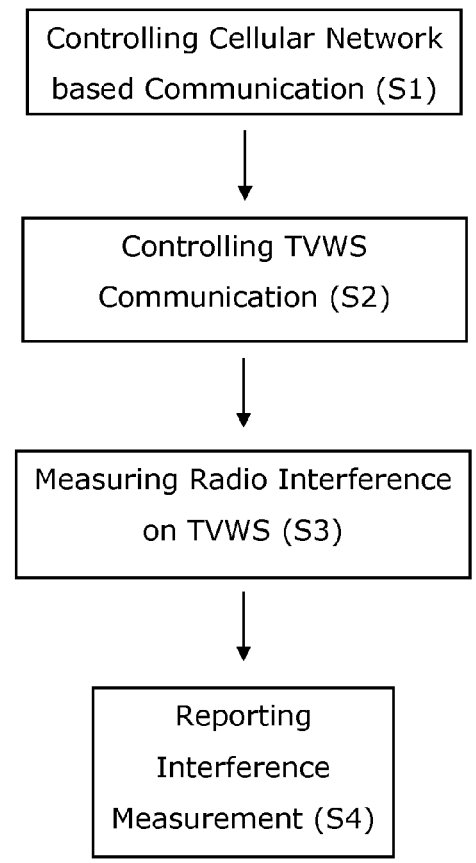
FIG. 2 shows a flow chart showing operations for performing a method according to certain embodiments of the present invention.
Figure 3:
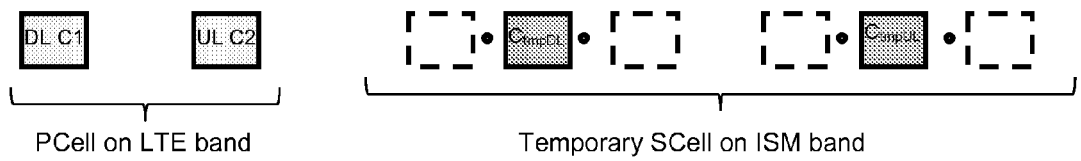
FIG. 3 shows PCell and temporary SCell carrier component configuration in a FDD system according to certain embodiments of the present invention.

FIG. 2 shows a principle flowchart of an example for a method according to certain embodiments of the present invention. That is, as shown in FIG. 2, this method comprises controlling S1 cellular network based communication in a primary cell on a frequency band related to the cellular network and by using an uplink and downlink configuration specific to the primary cell; controlling S2 communication in a secondary cell on a frequency band related to a television white space channel and by using an uplink and downlink configuration specific to the secondary cell; measuring S3 radio interference on a temporarily set uplink related carrier on the secondary cell based on information on the temporarily set uplink related carrier received on a downlink related carrier on the primary cell; and reporting S4 results of radio interference measurement via the primary cell.

One option for performing the example of a method according to certain embodiments of the present invention would be to use the apparatus as described above or a modification thereof which becomes apparent from the embodiments as described herein below.

Certain embodiments of the present invention are described herein below in further detail. It is to be noted though, that the features of the embodiments may be interchanged and mixed as will be understood from the whole of the present specification.

Specifically, certain embodiments of the present invention relate to TVBD and components thereof. Accordingly, in the following description is provided by referring to the example of TV white space. Though, as already indicated above, it is to be understood that the present invention is not limited to use on TV white space which should only be taken as a prominent example of unused radio bands/channels.

In the prior art cited above, the configuration of DL and UL carriers for all the LTE devices attached to an LTE eNB on a license-exempt band such as in TVWS is not considered. Accordingly, this requires new types of measurements as proposed below according to certain embodiments of the present invention.

Specifically, some of the below described embodiments of the present invention relate to LTE-A cellular communications in the license-exempt TVWS band, where other non-cellular systems such as WiFi (IEEE 802.11 standardization), Zigbee (IEEE 802.15), BlueTooth, and USB wireless systems may also co-exist.

According to certain embodiments of the present invention, a new RRC procedure to set up DL and UL carriers on TVWS channels is outlined:

Assuming a LTE FDD system:

1. Following UE Initial cell access, the eNB sets up a DL C1 and UL C2 on primary cell (PCell) via RRC connection setup on cellular band.
2. Following UE capability enquiry of UE In RRC_CONNECTED state on PCell, the eNB configures a DL carrier, $C_{tmpDL}$, and UL carrier, $C_{tmpUL}$, on secondary cell (SCell) via RRC connection reconfiguration on a TVWS channel.
3. The eNB indicates to the UE in new fields measObject and reportConfig for TVWS measurements in information element MeasConfig that TVWS interference measurements should be made on $C_{tmpUL}$ as given by UL grant signaled on DL carrier C1 on PCell in the LTE cellular band via cross-carrier scheduling re-using Release 10 Carrier Aggregation procedures. This allows
   Idle subframes with no PDCCH transmitted on DL carrier, $C_{tmpDL}$, and no transmission scheduled on UL carrier, $C_{tmpUL}$ of SCell.
   Co-ordination by eNB of other PCell-attached UE transmissions on $C_{tmpDL}$ and $C_{tmpUL}$ to avoid intra-SCell interference.
4. The TVWS interference measurements are triggered by the eNB when it activates the cross-carrier scheduling for the LTE UE via MAC control element. Accordingly, no DL measurement gap configuration is needed, as attached-UE performs measurements during UL subframe on SCell as indicated by UL grant on PCell.
   To allow continuous measurements, N consecutive subframes may be indicated by UL grant on PCell. The attached UE may buffer signal(s) received during the N subframes before starting the measurements depending on detection algorithms and types of secondary systems (i.e. averaging used for LTE, UTRAN, GERAN, WiMax, WiFi signal detection).
5. The LTE UE reports the TVWS interference measurements in a new MeasObjectTVWS via RRC signaling to the eNB on PCell.
6. The procedure is repeated for all available TVWS channels in the TVWS band for
   $C_{tmpDL}=\{C_{DL1}, C_{DL2}, \ldots, C_{DLK}\}$ and $C_{tmpDL}=\{C_{UL1}, C_{UL2}, \ldots, C_{ULK}\}$, with the condition that $C_{tmpDL}$ is different from $C_{tmpUL}$ at any measurement time (assuming LTE FDD system).
7. Based on measurements obtained over the TVWS setup interval, the eNB can configure DL carrier, $C_{DL}$, (typically choose the carrier with the least Interference measured) and UL carrier, $C_{UL}$, for the SCell on a TVWS channel.
   An average of TVWS Interference measurements from several UEs carried out over a TVWS setup time interval may be used.
   SCell setup on TVWS channel may be done for a specific UE or group of UEs based on their location and the inter-secondary system interference.
8. The eNB may de-activate the cross-carrier scheduling for the LTE UE via MAC control element if per-carrier scheduling is preferred (i.e. re-use Release 8 DCI format with Carrier Indicator Field extension)

This allows per-carrier DL grant and UL grant in SCell on TVWS band independently from the PCell.

The PCell is needed mainly for system information update (via RRC signaling) and RRC connection re-establishment, and the SCell activation/de-activation.

Assuming a LTE TDD System:

The outlined procedure may readily be applied to LTE TDD system, with eNB configuring a TDD UL and DL subframe configuration on a temporary carrier $C_{tmp}=\{C_{TDD1}, C_{TDD2}, \ldots, C_{TDDK}\}$ on SCell, and UL subframes on SCell being used for the measurements:

1. Following UE Initial cell access, the eNB sets up a TDD UL-DL subframe configuration on a carrier C1 on primary cell (PCell) via RRC connection setup on cellular band.
2. Following UE capability enquiry of UE in RRC_CONNECTED state on PCell, the eNB configures a TDD UL-DL configuration on a carrier ($C_{tmp}$) on secondary cell (SCell) via RRC connection reconfiguration on a TVWS channel.
3. The eNB indicates to the UE in new fields measObject and reportConfig for TVWS measurements in information element MeasConfig that TVWS interference measurements should be made during an UL subframe on $C_{tmp}$ as given by UL grant signaled on DL subframe on carrier C1 on PCell in the LTE cellular band via cross-carrier scheduling re-using Release 10 Carrier Aggregation procedures. This allows
   Idle subframes with no PDCCH transmitted on DL subframe on carrier, $C_{tmp}$, and no transmission scheduled on UL subframe, $C_{tmp}$, of SCell.
   Coordination by eNB of other PCell-attached UE transmissions on DL subframes and UL subframes on carrier, $C_{tmp}$, to avoid intra-SCell interference.
4. As in step 4 of the procedure for LTE FDD system outlined above, the TVWS Interference measurements are triggered by the eNB when it activates the cross-carrier scheduling for the LTE UE via MAC control element. Accordingly,
   no DL measurement gap configuration is needed, as attached-UE performs measurements during UL subframe on SCell as indicated by UL grant on PCell.
   To allow continuous measurements, N consecutive subframes may be indicated by UL grant on PCell. The attached UE may buffer signal(s) received during the N subframes before starting the measurements, depending on detection algorithms and types of secondary systems (i.e. averaging used for LTE, UTRAN, GERAN, WiMax, WiFi signal detection).
5. The LTE UE reports the TVWS Interference measurements in a new MeasObjectTVWS via RRC signaling to the eNB on PCell.
6. The procedure is repeated for all available TVWS channels in the TVWS band for $C_{tmp}=\{C_{TDD1}, C_{TDD2}, \ldots, C_{TDDK}\}$.
7. Based on measurements obtained over the TVWS setup interval, the eNB can configure a TDD UL-DL configuration on carrier, $C_{TDD}$, (typically choose the carrier with the least interference measured) for the SCell on a TVWS channel.
   An average of TVWS Interference measurements from several UEs carried out over a TVWS setup time interval may be used.
   SCell setup on TVWS channel may be done for a specific UE or group of UEs based on their location and the inter-secondary system Interference.

8. The eNB may de-activate the cross-carrier scheduling for the LTE UE via MAC control element if per-carrier scheduling is preferred (i.e. re-use Release 8 DCI format with Carrier Indicator Field extension)
   This allows per-carrier DL grant and UL grant in SCell on TVWS band independently from the PCell.
   The PCell is needed mainly for system information update (via RRC signaling) and RRC connection re-establishment, and the SCell activation/de-activation.

Accordingly, according to certain embodiments of the present invention new TVWS measurements on SCell triggered by cross-carrier scheduling indicated on PCell are reported by UE to eNB on PCell. The eNB sets up a SCell on TVWS for a PCell-attached UE or group of UEs based on the reported TVWS measurements and geo-location. The outlined procedures can be applied to LTE FDD and TDD systems. Further, steps 1, 2, and 8 mainly re-used Release 10 Carrier Aggregation mechanisms, while steps 3-7 are new and might require amendments to standardization.

Herein below are described further implementation specific aspects according to further embodiments of the present invention.

Implementation Aspects Related to LTE FDD Systems:

Measurement on $C_{tmpUL}$ on SCell.

Examples for the value of consecutive UL subframes, N, used for the measurements on $C_{tmpUL}$ can be as follows:
   In case the secondary system is another LTE system, the value of N may be at least 5 to detect the P-S/SCH signals transmitted every 5 ms.
   In case the secondary system is a WiFi system, the value of N may be at least 100 to allow long window detection for non-cellular signals such as WiFi beacons which typically may have a transmission interval of 0.1 s.

The WiFi measurements may be started by switching on the WiFi modem when the SCell on TVWS ConnectionReconfiguration is complete. The WiFi modem can scan the configured TVWS channels (i.e. $C_{tmpDL}$ and $C_{tmpUL}$) as configured in UE implementation once the TVWS measurement is triggered via MAC control element as received by RRC signaling in the LTE modem. The UE reports the TVWS measurements on $C_{tmpDL}$, $C_{tmpUL}$ in MeasObjectTVWS via RRC signaling on PCell. The TVWS measurements are repeated K times to scan all available TVWS channels (i.e. not used by the primary systems as determined by re-using mechanisms described in C. Stevenson, et. al, "IEEE 802.22: The first cognitive radio wireless regional area network standard," IEEE Communication, January 2009, and "Developing a Standard for TV White Space Coexistence: Technical Challenges and Solution Approaches", Tuncer Baykas, NICT, Mark Cummings, Envia, Hyunduk Kang, ETRI, Mika Kasslin, Nokia, Joe Kwak, InterDigital, Richard Paine, Alex Reznik, InterDigital, Rashid Saeed, TMRND, and Stephen J. Shellhammer, Qualcomm, http://www.ieee802.org/19/arc/stds-802-19list/docrnXZz7qdyI.doc). The eNB may subsequently set up the CC DL and UL components $C_{DL}$, $C_{UL}$ on the SCell at the end of the TVWS setup interval.

SCell Setup Procedure on TVWS

Figure 4:
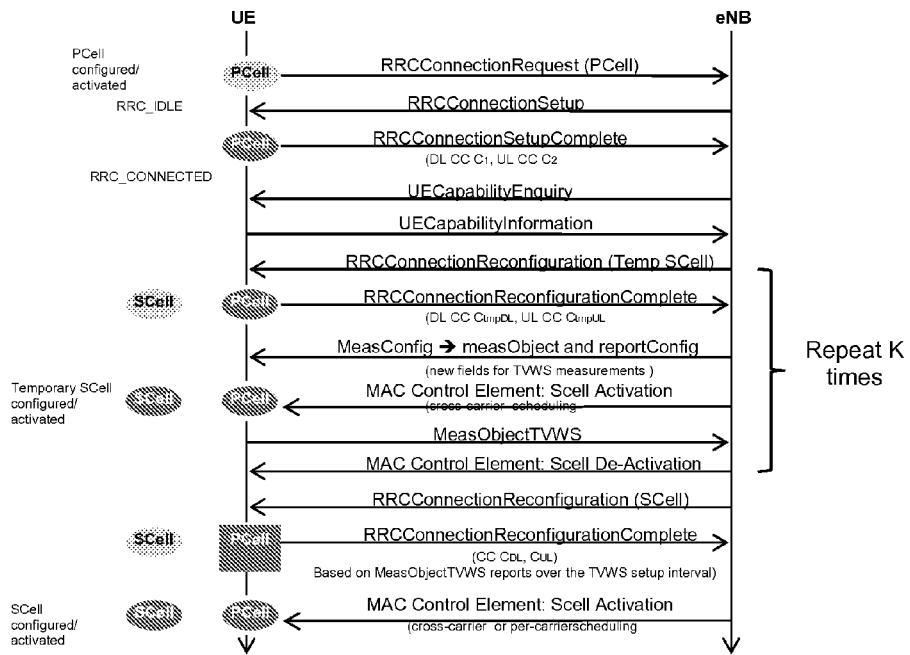
FIG. 4 shows SCell setup on TVWS for a LTE FDD system according to certain embodiments of the present invention.
Figure 5:
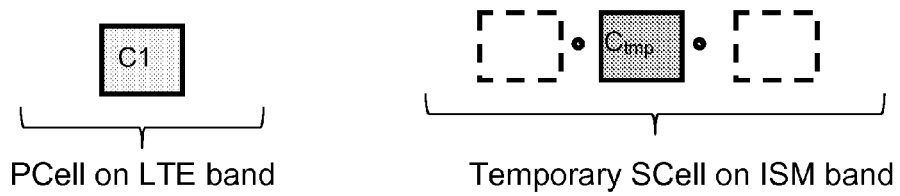
FIG. 5 shows SCell setup on TVWS for a LTE TDD system according to certain embodiments of the present invention.
Figure 6:
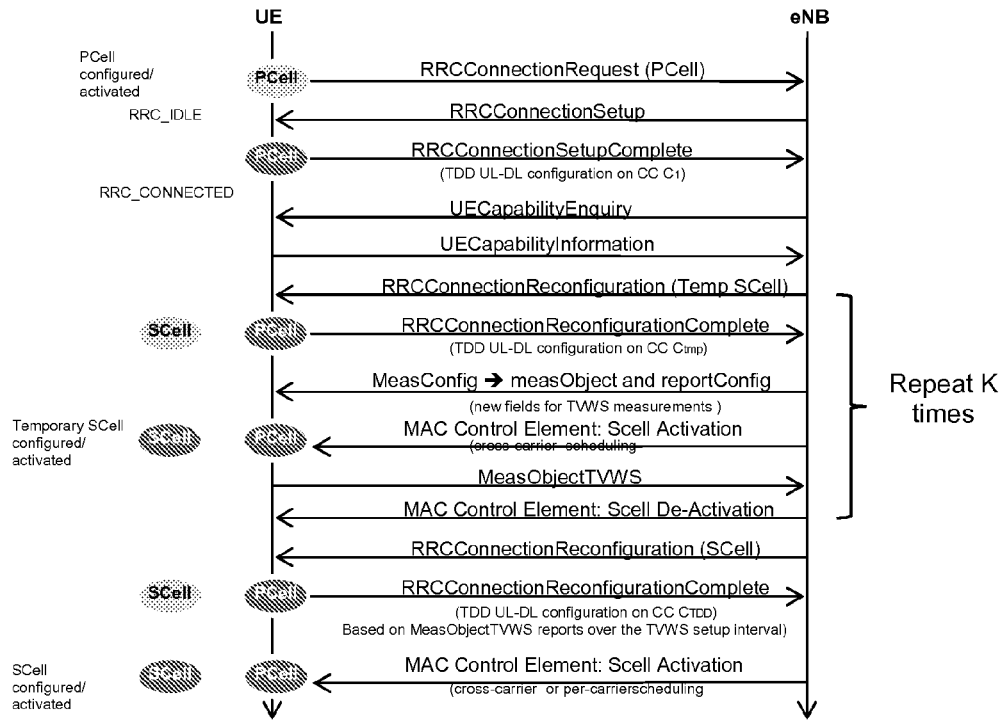
FIG. 6 shows SCell setup on TVWS for a LTE TDD system according to certain embodiments of the present invention.

The flow diagram of the SCell setup procedure is illustrated on FIG. 4. Once the PCell is setup on DL C1 and UL C2, a temporary SCell setup on CCs $C_{tmpDL}$ and $C_{tmpUL}$ for TVWS measurement on a TVWS channel is initiated by the eNB. The carrier configuration on LTE band and TVWS band is illustrated in Fig. The UE reports the TVWS measurements in measObjectTWS via RRC signaling on PCell. The procedure is repeated K times for difference $C_{tmpDL}$ and $C_{tmpUL}$ values. Based on the reported TVWS measurements, the eNB sets up the CC $C_{DL}$ and CC $C_{UL}$ on the best TVWS channels.

Selection of CC DL and UL carriers on SCell in TVWS

Some averaging based on TVWS measurements from several attached UEs in PCell could be used to determine the overall best CC DL and UL carriers for a group of attached UEs. Different SCell may be setup for a PCell attached UE or group of UEs on the TVWS based on their location as reported to the eNB via Release 9 positioning procedure. This allows optimized SCell setup based on the geographical inter secondary system interference within the serving PCell cell.

RRC Signaling to Setup TVWS Measurements for Geo-Located UEs within Serving PCell The signaling required for the temporary SCell setup on CCs $C_{tmpDL}$ and $C_{tmpUL}$ for TVWS measurement on a TVWS channel could be sent by the eNB to a group of geo-located UEs via common group signaling to reduce the RCC signaling overhead. Only the UE-specific reports the TVWS measurements in measObjectTWS will require dedicated signaling.

Implementation Aspects Related to LTE TDD Systems:

The implementation aspects described above for a LTE FDD system may readily be applied to a LTE TDD system, with eNB configuring a TDD UL and DL subframe configuration on a temporary carrier $C_{tmp} = \{C_{TDD1}, C_{TDD2}, \ldots, C_{TDDK}\}$ on SCell, and UL subframes on SCell being used for the measurements. Specifically:

Measurement on $C_{tmp}$ During UL Subframe on SCell.

Examples for the value of consecutive UL subframes, N, used for the measurements can be as follows
   In case the secondary system is another LTE system, the value of N may be at least 5 to detect the P-S/SCH signals transmitted every 5 ms.
   In case the secondary system is a WiFi system, the value of N may be at least 100 to allow long window detection for non-cellular signals such as WiFi beacons which may have a transmission interval of 0.1 s typically.

The WiFi measurements may be started by switching on the WiFi modem when the SCell on TVWS ConnectionReconfiguration is complete. The WiFi modem can scan the configured TVWS channels (i.e. $C_{tmp}$) as configured in UE implementation once the TVWS measurement is triggered via MAC control element as received by RRC signaling in the LTE modem. The UE reports the TVWS measurements on $C_{tmp}$ in MeasObjectTVWS via RRC signaling on PCell. The TVWS measurements are repeated K times to scan all available TVWS channels (i.e. not used by the primary systems as determined by re-using mechanisms described in C. Stevenson, et. al, "IEEE 802.22: The first cognitive radio wireless regional area network standard," IEEE Communication, January 2009, and "Developing a Standard for TV White Space Coexistence: Technical Challenges and Solution Approaches", Tuncer Baykas, NICT, Mark Cummings, Envia, Hyunduk Kang, ETRI, Mika Kasslin, Nokia, Joe Kwak, InterDigital, Richard Paine, Alex Reznik, InterDigital, Rashid Saeed, TMRND, and Stephen J. Shellhammer, Qualcomm, http://www.ieee802.org/19/arc/stds-802-19list/docrnXZz7qdyI.doc). The eNB may subsequently set up the CC $C_{TDD}$ with the desired TDD UL-DL subframe configuration on the SCell at the end of the TVWS setup interval.

In a certain preferred embodiment, TDD UL-DL configuration #6 (i.e. DSUUUDSUUD) on temporary carrier, $C_{tmp}$, could be configured by the eNB as it allows more UL subframes for the TVWS measurements. The choice of the TDD UL-DL configuration on SCell during the TVWS measurement phase has no impact on TVWS measurement reporting to eNB, since it is done by the PCell-attached UEs on PCell on licensed band.

SCell Setup Procedure on TVWS

The flow diagram of the SCell setup procedure is illustrated in FIG. 66. Once the PCell is setup on CC C1, a temporary SCell setup on CC $C_{tmp}$ for TVWS measurement on a TVWS channel is initiated by the eNB. The carrier configuration on LTE band and TVWS band is illustrated in FIG. 55. The UE reports the TVWS measurements in measObjectTWS via RRC signaling on PCell. The procedure is repeated K times for different $C_{tmp}$ values. Based on the reported TVWS measurements, the eNB sets up the CC $C_{TDD}$ on the best TVWS channels.

Selection of CC DL and UL carriers on SCell in TVWS

Some averaging based on TVWS measurements from several attached UEs in PCell could be used to determine the overall best CC carriers for a group of attached UEs. Different SCell may be setup for a PCell attached UE or group of UEs on the TVWS based on their location as reported to the eNB via Release 9 positioning procedure. This allows optimized SCell setup based on the geographical inter secondary system interference within the serving PCell.

RRC Signaling to Setup TVWS Measurements for Geo-Located UEs within Serving PCell The signaling required for the temporary SCell setup on CCs $C_{tmp}$ for TVWS measurement on a TVWS channel could be sent by the eNB to a group of geo-located UEs via common group signaling to reduce the RCC signaling overhead. Only the UE-specific reports the TVWS measurements in measObjectTWS will require dedicated signaling.

Figure 7:
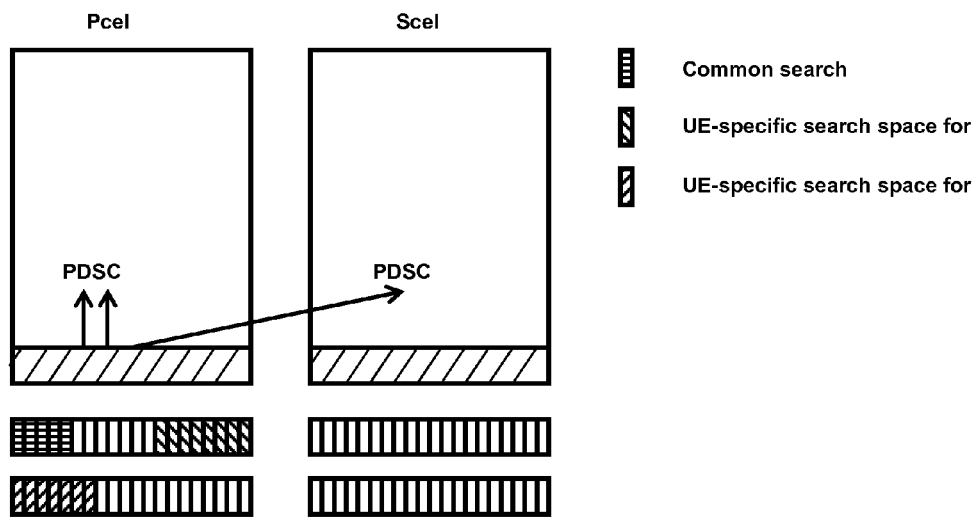
FIG. 7 shows SCell-specific search space according to certain embodiments of the present invention.
Figure 8:
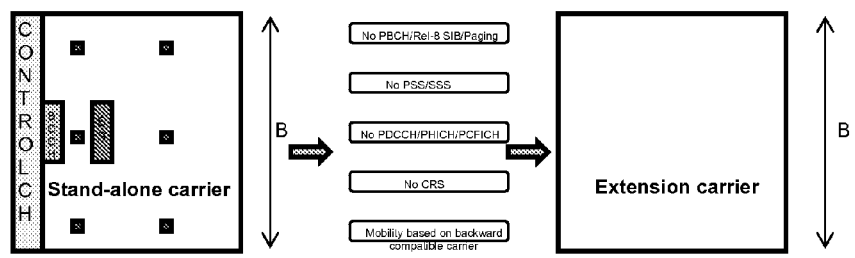
FIG. 8 shows an extension carrier according to certain embodiments of the present invention.

Implementation Aspects Related to the Use of Cross-Carrier Scheduling and Extension Carriers for TVWS Measurements:

The eNB indicates to the UE the UL resources for TVWS measurements (UL CC CtmpUL or UL SF on CC tmp) by UL grant signaled on DL PDCCH subframe on PCell in the LTE cellular band via cross-carrier scheduling re-using Release 10 Carrier Aggregation procedures. The UE may monitor the PDCCH for SCell in the SCell-specific search space as illustrated in FIG. 7. This allows quasi Idle subframes with no PDCCH transmitted on DL resources (DL CC CtmpDL or DL SF on CC tmp) in temporary SCell. Co-ordination by eNB of other PCell-attached UE transmissions on DL and UL resources to avoid intra-SCell interference may readily be done by the cross-carrier-scheduler.

To make the UL subframes for TVWS measurements completely idle, extension carriers may be configured to avoid transmission of essential level 1 (L1) signaling (i.e. P/S-SCH, BCCH, PCH in mid 6PRBs as illustrated in FIG. 88). The UL resources for the TVWS measurements may be indicated by eNB to the UE via cross-carrier scheduling as described above. This allows "cleaner" measurement time intervals for TVWS measurements—i.e. no LTE signal transmissions. Use of extension carriers is not Rel-8 backward compatible, and hence does not allow temporary SCell to support Rel-8 UEs. However, this has no impact on Rel-8 UEs, as once the procedure on SCell configuration on TVWS is completed, the SCell may be configured with a standalone component carrier (i.e. no extension carrier) with either (1) Rel-8 DCI format to support Rel-8 UEs;
 (ii) extended Rel-8 DCI format with Carrier Indicator Field for Rel-10 UEs with multiple component carriers and PDCCH transmitted in each component carrier; or
 (iii) cross-carrier scheduling for Rel-10 UEs for Rel-10 UEs with multiple component carriers and PDCCH transmitted in only the component carrier in PCell.

Implementation Aspects to UE:

The TVWS measurements may be done by currently implemented modems (i.e. LTE modem, WiFi modem) re-using specified network discovery ways. However, frequency variants in the TVWS spectrum would have to be considered. Further coordination will be needed between the modems implemented in the UE. This may involve access common memory space to check configuration parameters (e.g. beacon measurement parameters, available TVWS channel configuration) and status flags (start TVWS measurements). Examples of such cooperation, e.g. dual-mode cellular-handset with seamless handover between WiFi/GSM, are provided in Unlicensed Mobile Access (UMA) (see e.g. White Paper ON Dual Mode Phone (GSM & Wi-Fi), http://canarie.co.in/dualmodephone.pdf; and http://www.blackberrytoday.com/articles/2006/4/2006-4-14-Nokia-Demos-Cellular.html).

According to certain embodiments of the present invention, there are advantages in the setup by eNB of SCell for a PCell-attached UE or group of UEs on TVWS with the lowest interference from other secondary systems (i.e. other LTE cellular systems, non-cellular systems) based on the reported TVWS measurements and geo-location. Further, no DL measurement gap configuration is needed, as attached-UE performs measurements during UL subframe on SCell as triggered by cross-carrier scheduling via UL grant in PDCCH transmitted on PCell. In addition, re-use of R10 Carrier Aggregation mechanisms is possible with only new standardization needed for TVWS specific measurements, i.e. LTE UE reports TVWS measurements in new MeasObjectTVWS via RRC signaling.

As described above, certain embodiments of the present invention provide effectively configuring carrier aggregation onto unused radio bands/channels, so that novel devices (such as new LTE handsets) and networks utilizing e.g. TV WS (and other unlicensed spectrum) can make effective use thereof.

As indicated above, implementation examples for certain embodiments of the present invention include user equipment and eNB equipment such as according LTE/LTE-Advanced and components thereof, but are not limited thereto, and further include e.g. modems and other communication devices.

According to the above description, it should thus be apparent that exemplary embodiments of the present invention provide, for example from the perspective of a handset such as a user equipment or a network element such as an eNB or a component of these, an apparatus embodying the same, a method for controlling and/or operating the same, and computer program(s) controlling and/or operating the same as well as mediums carrying such computer program(s) and forming computer program product(s).

For example, described above are apparatuses, methods and computer program products capable of configuring carrier aggregation onto unused radio bands/channels. Specifically, for example an apparatus, method and computer program product comprising controlling cellular network based communication in a primary cell on a frequency band related to the cellular network and by using an uplink and downlink configuration specific to the primary cell; controlling communication in a secondary cell on a frequency band related to a television white space channel and by using an uplink and downlink configuration specific to the secondary cell; measuring radio interference on a temporarily set uplink related carrier on the secondary cell based on information on the temporarily set uplink related carrier received on a downlink related carrier on the primary cell; and reporting results of radio interference measurement via the primary cell.

Implementations of any of the above described blocks, apparatuses, systems, techniques or methods include, as non limiting examples, implementations as hardware, software, for example in connection with a digital signal processor, an instruction set, firmware, special purpose circuits or application logic, general purpose hardware or controller or other computing devices, or some combination thereof. Software or application logic or an instruction set may be maintained on any one of various conventionally available computer-readable media (which shall be understood as anything which can contain, store, communicate, propagate or transport instructions in connection with an instruction execution system). Further, it is to be understood that where reference is made to a processor, such processor is to be understood in its broadest sense and may, for example, additionally comprise or not comprise a memory (e.g., ROM, CD-ROM, etc.), and it may comprise a computer processor, an application-specific integrated circuit (ASIC), a field-programmable gate array (FPGA), and/or other hardware components that have been programmed in such a way to carry out the described function.

If desired, the different functions discussed herein may be performed in a different order and/or concurrently with each other. Furthermore, if desired, one or more of the above-described functions may be optional or may be combined.

Although various aspects of the invention are set out in the appended independent claims, other aspects of the invention comprise other combinations of features from the described embodiments and/or the dependent claims with the features of the independent claims, and not solely the combinations explicitly set out in the claims.

What is described above is what is presently considered to be preferred embodiments of the present invention. However, as is apparent to the skilled reader, these are provided for illustrative purposes only and are in no way intended that the present invention is restricted thereto. Rather, it is the intention that all variations and modifications be included which fall within the spirit and scope of the appended claims.

What is claimed is:

1. An apparatus, comprising:
 a processor configured to
  control cellular network based communication in a primary cell on a frequency band related to the cellular network and by using an uplink and downlink configuration specific to the primary cell;
  control communication in a secondary cell on a frequency band related to an unlicensed channel and by using an uplink and downlink configuration specific to the secondary cell; and
  measure radio interference on a temporarily set uplink related carrier on the secondary cell based on information on the temporarily set uplink related carrier received on a downlink related carrier on the primary cell; and
 a communication interface configured to report results of radio interference measurement via the primary cell, wherein
 the uplink and downlink configuration specific to the primary cell is represented by separate carriers for uplink and downlink, respectively, so that the information on the temporarily set uplink related carrier is received on a dedicated downlink carrier of the primary cell, and
 the uplink and downlink configuration specific to the secondary cell is represented by separate carriers for uplink and downlink, respectively, so that the temporarily set uplink related carrier on the secondary cell is a dedicated uplink carrier of the secondary cell.

2. The apparatus according to claim 1, wherein the processor is configured to detect all available unlicensed channels and to repeat measurement for each of the available unlicensed channels.

3. The apparatus according to claim 1, wherein the processor is configured to:
 control frequency domain duplexing based communication in the primary cell and in the secondary cell;
 process information about setting of non-temporary carriers for uplink and downlink, respectively, received in response to operation of the measurement reporting; and
 control the communication in the secondary cell by setting the non-temporary carriers for uplink and downlink, respectively.

4. The apparatus according to claim 1, wherein
the processor is configured to control time domain duplexing based communication in the primary cell and in the secondary cell.

5. The apparatus according claim 1, wherein
the apparatus is a communication handset.

6. The apparatus according to claim 1, wherein
the processor is a chipset.

7. The apparatus according to claim 1, wherein
the uplink and downlink configuration specific to the primary cell is represented by an uplink and downlink subframe configuration on a common carrier so that the information on the temporarily set uplink related carrier is received on a downlink sub frame of the carrier of the primary cell.

8. The apparatus according to claim 7, wherein
the uplink and downlink configuration specific to the secondary cell is represented by an uplink and downlink subframe configuration on a common carrier so that the temporarily set uplink related carrier on the secondary cell is a an uplink sub frame on the common carrier of the secondary cell.

9. The apparatus according to claim 8, wherein
the processor is configured to process information about setting of a non-temporary uplink and downlink configuration on a common carrier received in response to operation of the measurement reporting.

10. The apparatus according to claim 9, wherein
the processor is configured to control the communication in the secondary cell by setting the non-temporary uplink and downlink configuration on a common carrier.

11. A method, comprising:
 controlling cellular network based communication in a primary cell on a frequency band related to the cellular network and by using an uplink and downlink configuration specific to the primary cell;
 controlling communication in a secondary cell on a frequency band related to an unlicensed channel and by using an uplink and downlink configuration specific to the secondary cell;
 measuring radio interference on a temporarily set uplink related carrier on the secondary cell based on information on the temporarily set uplink related carrier received on a downlink related carrier on the primary cell; and
 reporting results of radio interference measurement via the primary cell, wherein
 the uplink and downlink configuration specific to the primary cell is represented by separate carriers for uplink and downlink, respectively, so that the information on the temporarily set uplink related carrier is received on a dedicated downlink carrier of the primary cell, and
 the uplink and downlink configuration specific to the secondary cell is represented by separate carriers for uplink and downlink, respectively, so that the temporarily set uplink related carrier on the secondary cell is a dedicated uplink carrier of the secondary cell.

12. The method according to claim 11, further comprising:
detecting all available unlicensed channels and repeating measurement for each of the available unlicensed channels.

13. The method according to claim 11, further comprising:
controlling frequency domain duplexing based communication;
processing information about setting of non-temporary carriers for uplink and downlink, respectively, received in response to the reporting; and
controlling the communication in the secondary cell by setting the separate non-temporary carriers for uplink and downlink, respectively.

14. The method according to claim 11, further comprising:
controlling time domain duplexing based communication in the primary and in the secondary cell.

15. The method according to claim 11, wherein
the uplink and downlink configuration specific to the primary cell is represented by an uplink and downlink subframe configuration on a common carrier so that the information on the temporarily set uplink related carrier is received on a downlink subframe of the carrier of the primary cell.

16. The method according to claim 15, wherein
the uplink and downlink configuration specific to the secondary cell is represented by an uplink and downlink sub frame configuration on a common carrier so that the temporarily set uplink related carrier on the secondary cell is a an uplink sub frame on the common carrier of the secondary cell.

17. The method according to claim 16, further comprising:
processing information about setting of a non-temporary uplink and downlink configuration on a common carrier received in response to the reporting.

18. The method according to claim 17, further comprising:
controlling the communication in the secondary cell by setting the non-temporary uplink and downlink configuration on a common carrier.

19. A non-transitory computer-readable storage medium configured to store computer-executable instructions, which when executed by circuitry, cause the circuitry to:
control cellular network based communication in a primary cell on a frequency band related to the cellular network and by using an uplink and downlink configuration specific to the primary cell;
control communication in a secondary cell on a frequency band related to an unlicensed channel and by using an uplink and downlink configuration specific to the secondary cell;
measure radio interference on a temporarily set uplink related carrier on the secondary cell based on information on the temporarily set uplink related carrier received on a downlink related carrier on the primary cell; and
report results of radio interference measurement via the primary cell, wherein
the uplink and downlink configuration specific to the primary cell is represented by separate carriers for uplink and downlink, respectively, so that the information on the temporarily set uplink related carrier is received on a dedicated downlink carrier of the primary cell, and
the uplink and downlink configuration specific to the secondary cell is represented by separate carriers for uplink and downlink, respectively, so that the temporarily set uplink related carrier on the secondary cell is a dedicated uplink carrier of the secondary cell.

* * * * *